Figure 1:
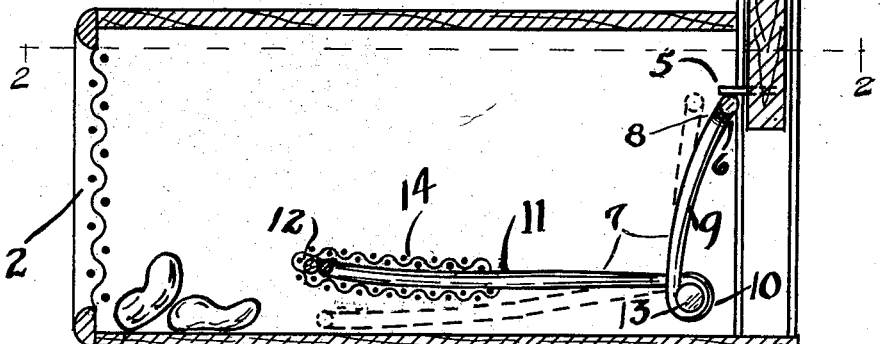

Aug. 17, 1948.  G. S. WARNER  2,447,147
ANIMAL TRAP
Filed Jan. 1, 1945

Gilbert S. Warner, Inventor
By Percy Tate Griffith, Attorney

Patented Aug. 17, 1948

2,447,147

UNITED STATES PATENT OFFICE 2,447,147

ANIMAL TRAP

Gilbert S. Warner, Palma Sola, Fla., assignor to William Hegener, Sarasota, Fla.

Application January 1, 1945, Serial No. 570,849

5 Claims. (Cl. 43—61)

This invention relates to box-traps intended to capture the animals alive, without injury, preferably singly, for the purpose of pathological research, examination of the captives for evidence of disease, especially of rare and unusual infectious diseases; in which scientific pursuit various desiderata in connection with the animals and the trapping thereof have become known from experience and have been given full consideration in the making of this invention.

The principal objects of my invention are, first, to provide an animal trap of the indicated kind, which will not only more frequently and surely effect capture without injury, but one in which the animal's behavior habits are decisively met in certain necessary ways, e. g., making the trap as much as possible a customary woods object, as expected and undifferentiated from the animal's habitat, since largely the animals caught and examined are wild, and, where domestic or house rodents, commonly range in and about wooden structures; and it is important that the trap, offering the lure of bait, be in harmony with the environment factors experientially associated with food and feeding in the animal's short but tense life of suspicion, distrust and timidity linked with rapacity. Second, to provide a trap wherein the bait is not presented upon a piece of mechanism appertaining to the trap, to spring it instantly whatever the intruder, but is so arranged and offered, and the trap so set, that alien undesired animals may, after exterior inspection, enter, inspect the bait from inside, even be permitted to walk out with some of it, and leave freely. Third, a trap which may be used, and adjusted, to trap an animal of the type and size desired to capture, and fail to be sprung by others; one whereby adjustment may adapt the trap at one moment to one type and size with unlikelihood of springing by others, yet the same trap may later be employed to capture an animal of a larger or smaller type, as desired. Fourth, to provide a trap of the utmost simplicity and efficiency of foolproof mechanism, without spring-actuated parts, spring doors, or various movable pieces which render it difficult to set the trap with any certainty that it will remain set after leaving it, while the slight jar of a passing animal will spring it. Fifth, to provide a trap which may either be set "hard" or "easy," may require, when set, quite a weight or pull or shove of a vigorous animal to release its door, or contrarily require a slight touch, which is usually termed a "trigger touch" of a small light or weak animal, according to the wish of the trapper and the way the trap is intended to act in connection with smaller and larger entrants lured by the bait. Sixth, a trap of this character which, beside the box and door, will comprise simply and solely one unitary working part, despite its aforesaid adjustability. Seventh, one which can be set by hand of the trapper, even adjusted to hard or easy tripping by that one hand.

With the indicated objects in view, and other subordinate objects which will hereinafter appear, my invention consists in a box trap such as hereinafter described and shown, and in such novel features and construction as particularly carry out the scheme and purposes of the invention as thus far set forth.

In the accompanying drawings, forming part of this specification, in which like letters of reference designate like parts in the several views:

Figure 1 is a vertical central longitudinal section of a trap embodying my invention, open for ingress of an animal and set for trapping a small animal, or either a small or a large one, not being restricted, in this position, to any special type or size of specimen desired, and the door being held open by contact with the nail or pin thereon resting upon the crossbar of the yoke forming part of the operating mechanism.

Figure 2:
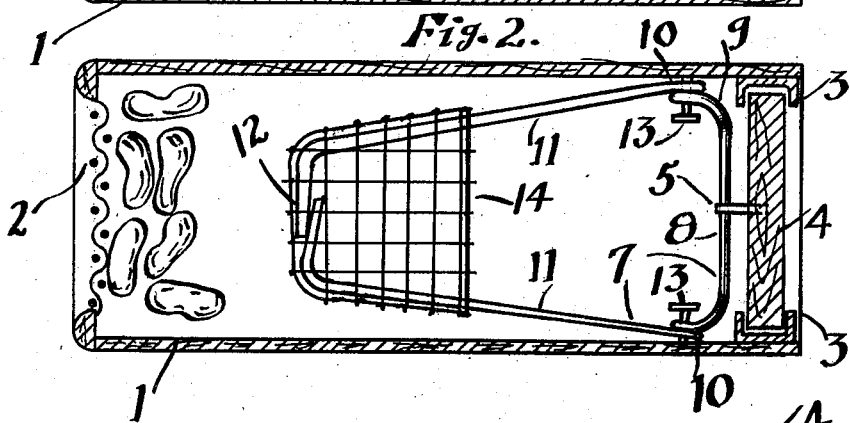

Figure 2 is a sectional plan view of the same, taken upon the line 2—2 of Figure 1.

Figure 3:
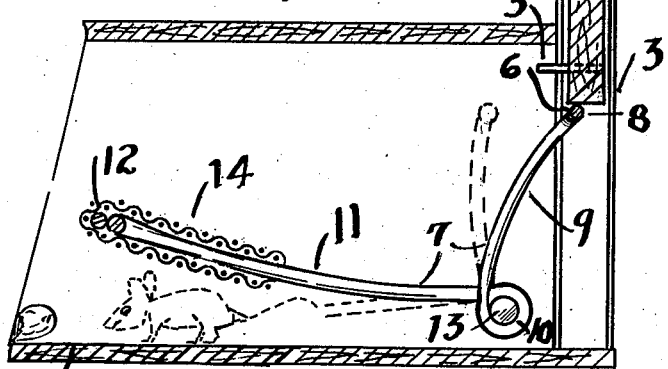

Figure 3 is a view similar to Figure 1, of the same trap set for capturing a larger type or size of animal where it is desired and planned to avoid as far as possible the springing of the trap by undesired smaller animals, and showing the door held open in set position by direct contact of the lower edge of the door upon the crossbar of the yoke, the rear end of the trap being cut away. The altered angle of the horizontal portion of the operating mechanism is purposeful, and functional, as will later be explained. In all the figures, the wire frame of the operating mechanism is shown heavier in proportion than it need be.

In the practice of my invention I construct a box trap in much the usual form and manner comprising the rectangular box 1, of hard wood, with four solid walls including two sides, top or roof, bottom or floor, fill up the rear end of the box with a wire screen 2, fixed permanently in place, and leave the front end completely open except for two guides 3, preferably square U-angled and formed of sheet metal such as galvanized iron. In these guides I mount a solid door 4, neatly fitting, thick enough to have adequate weight, and to withstand any attempt of the animal to escape after capture, or to eat away any of it; of course it should be flat and straight, with an even lower edge, and preferably a trifle longer or higher than the height of the box, being raised when desired, by seizing the upper edge. Near the lower edge I mount in the inner face of this door a pin or common nail 5, placed a material distance above said edge, and also located to strike the roof when the door is raised too high, so as to prevent the door from being removed. Some of these details may be varied, but it is quite desirable that they be built as stated, or substantially so.

Next, the lever-mechanism consists of a frame 6, made in one piece from selected wire which will be stiff and stout as shown in the drawings, but pliable without breaking or cracking upon being bent and rebent back into its previous condition. This wire frame is initially shaped in the unique form shown by first bending the central portion of a piece of wire into a U-shaped yoke 7, of which the crossbar 8 forms the upper part of the frame when in position, and lies upon two side members 9, which extend downwardly and outwardly in a curved direction to a point where the wire of the frame is turned upon itself at each side to form loops 10, the wire making exactly a complete circle, and thence ranges in an approximately 90° angle from the side-members 9 rearwardly in a nearly horizontal position, at each side of the trap body or each end of the wire, to form longitudinal sidebars 11. The ends of the wire are then turned at an angle to approach each other, overlap, and form the end bar 12, which also unites the rear portion of the yoke of the frame. Through the loops 10 are driven nails 13, which serve as pivots for the frame, and said nails may be replaced by screws or any other form of pivot. Across the rear end of the wire frame 6 is fixed a platform 14, formed by extending wires across said frame at the rear, preferably by affixing a piece of wire netting of coarse mesh to the sidebars 11 and to the endbar 14.

In the normally unset position, indicated by dotted lines in Figure 1, with the rear end of the frame resting upon the floor of the trap, and the yoke 7 in the air, while in the set position the said platform is raised and the yoke 7 close to the door 4. It will be observed that I form the two side members 9 curved upwardly and forwardly from the loops 10 and the rear of the pivots 13 in a segmental curve, and that the width of the yoke 7 is sufficient to cause the loops of the frame to lie almost but not quite in frictional contact with the sidewalls of the trap, there being left just such space between said loops and walls as to make them operate easily and freely; but if it is desired to increase or decrease the play of the loops, the yoke may be stretched or brought shorter with the pressure of the hand to adjust this. The side members 9 I may make of any length desired, higher than illustrated in Figures 1 and 3, up to the limit of just under the height of the roof of the trap.

The length of the sidebars 11 may be shorter or longer than shown, but they should in all or usual cases be made of only such length as to leave a substantial space between the endbar 12 and the screen wire 2 in the rear wall, since contrary to previous constructions and methods, I plan to keep the bait removed from the platform or wire mesh 14, for purposes essential for all and not only a part of the objects and functions of my newly invented trap, as outlined in the preamble hereof and more fully set forth hereinafter. As shown, I make the wire frame in the trap depicted, approximately two thirds of the length of the trap between the front opening at one end and the wire screen 2 at the other, though no ratio is necessary to be observed, and the space left for bait at rear may be varied therefrom.

When it is desired to capture an animal of large type or size, a simple change in the trap may be made by the user, without tools, to alter the conditions presented by the trap in respect to both the larger animal sought, and the smaller animals aimed to be avoided, at least not captured or permitted to spring the trap. To do this, the sidebars 11 and endbar 12 are manually grasped by the trapper, and the rear end of the wire frame bent upwardly, raising the platform 14 as well as said sidebars 11 and endbar 12. It will be seen from Figure 3 that this somewhat changes the angle of the rear portion of the sidebars 11 relatively to the front bars 9 of the yoke 7, increasing the acuteness of said angle slightly or much, depending upon the extent of bending, and in the set position shown in full lines in the drawing the platform and the sidebars and endbar are so elevated above the floor of the trap that a small animal may enter the trap, run under the platform and examine the bait, without coming in contact therewith and springing the trap.

It is my custom to make the guides 3 in which the door slides, higher than the roof of the trap to support the door better in raised position, and the door may be made high enough to extend above said roof when dropped to the floor, or it may be made just adequately high to effect complete closure. The wooden material of the trap is made smooth, and its walls fitted neatly, but no attempt should be made to give any unusual finish or gleam to it, the complete trap should be as simple and plain as possible, looking like any other portion of the environment, though its top may be marked with distinctive marks visible to show the trapper where he left his traps, or where they have been accidentally removed to.

The operation of my trap will be manifest from the foregoing description taken in connection with the drawings. The trap having been made of a size adapted to the type of animals sought, and to a fairly varied range of such animals, and since it's desired to use it indiscriminately as to size, age, weight of the captive made, the wire frame is manually adjusted, or is left adjusted as made and delivered, so that the platform 14 will lie a little above the floor of the trap when the crossbar 8 of the yoke 7 is placed immediately under the lower edge of the door 4, when said door is elevated above the height of said crossbar 8. Should the platform 14 be deemed too low at the instant of contact of crossbar and door, the sidebars 11 are slightly bent upward. If said platform seems too high, it is lowered by reversely bending said side-bars. If it is intended to set the trap with the door resting flatly upon the crossbar 8, and the trap is so adjusted, all that remains is to place the bait in the trap, at the rear, in the space between the platform 14 and the wire screen 2, carry the trap to the place where it is to be left, and then set it by the simple expedient or process of raising the door with one hand, holding it up with the back of the fingers of that hand, and simultaneously or sequently drawing the cross-bar 8 of the yoke 7 with the tips of the fingers, under the lower edge of the door, which fits thereunder as shown in Figure 3, the said yoke being U-shaped as stated, and the cross-bar 8 thereof forming the upper part of the frame, lying upon the two side-arms which extend downwardly and outwardly in a curved direction to the loops 10. If it appears for any reason that the platform is not, when so set, lying at the right height, the door is held up by the back of the said hand, and the fingers thereof used to bend the wire side bars 11 any way desired to suit the trapper. If he wishes to set the trap "hard," it is now correctly set. If he wishes to set it more "easy," he can place the crossbar 8 a trifle more to the rear edge of the door 4, even to the "hair-trigger" position the crossbar just catching the door edge. And he can also set the crossbar on the pin or nail 5, immediately under the projecting end or point thereof. Of course, if his work is daily routine, he will either find his trap at the best and most effective adjustment, or will at the outset adjust it to his own preferences, and leave it that way until need arises for a change. If he is a householder or inexpert user of a trap, he will find it quite unnecessary to do anything but open the door, put in his bait, raise the door to the correct height, and set the crossbar 8 under it or under the pin or nail 5, as the mechanism is so simple that anyone can set it with one hand as aforesaid, or with both hands as other traps have been set in his experience or observation. The range of setting hard or easy is not only considerable, but effected without the use of complicated or delicate mechanisms, and it can be set so lightly on the door edge or pin, that the least touch of a tiny mouse will release the door, it being noted that the length relation of the platform lever portion, as embodied in the length of side bar 11, to that of the yoke is such that the platform is many times as distant from the pivot point 10 as the yoke is, hence platform pressure need only be faint there to be effective upon said yoke, and at whatever point of the entire frame 6 the animal touches, at either side of the mechanism, his impulse is transmitted to the whole yoke somewhat evenly, owing to the fact that the entire mechanism is a single unitary device equally balanced between both side walls, and solely pivoted close to the front of the trap as near to the door as the necessary curve of the side members 9 of the yoke will allow. The pin or nail not only serves for setting of the trap, but also contacts the roof on the upper motion of the door, to prevent this door from coming out, and being lost or misplaced.

When it is desired to employ the trap to catch the individual type or size of animal, and small alien unwanted animals abound nearby, it is a matter of a moment to solve this problem measurably to exclude these smaller ones from springing the trap, as they will do frequently and successively, by the indicated method of bending the yokeframe of my operating mechanism as before defined, and as shown in Figure 3, raising the bars 11 and the platform so high that small animals entering will run under the platform, and as the bait is not attached to the mechanism or its platform, but is freely accessible, the little intruder may help himself to part of the bait, and run out with it. The habit of most rodents is to carry off bait, not stay and chew it. Several trips may be made this way by one or more animals, and the trap remain set for the larger animal sought, who not only will disperse the small ones, but be attracted to the bait and encouraged to enter the trap by their presence and immunity. In the use of the trap for this endeavored exclusion of unwanted smaller animals, it is preferable to set the trap "hard," with the yoke 7 under the middle of the door edge as before described. The bait being in the rear, and not on the platform or other part of the mechanism, there is nothing to prevent sundry animals from entering, removing a moiety of the bait, and leaving the trap fully set for the larger captive wanted. Of course if any trapper desires for any reasons of his own to use bait on the platform, my trap does not prohibit this, but he will find that he loses the greatest value of the trap in so doing. The customary manner of springing my trap is, that first the animal, if small or medium, will go to the bait, and either in an endeavor to reach it, or often in the endeavor to remove it, will leap or step upon the platform, or joggle the mechanism, and the least touch will spring it, as and for the reasons above indicated, unless it has purposely been set "hard" to exclude his kind.

Minor changes may of course be made within the spirit and purview of my invention as herein described and as set forth in the claims, though I believe it will be found most effective if made and used as I have directed. Minor features all have their function and usefulness; for example, setting the pin or nail 5 adequately above the lower edge of the door, allows setting the crossbar 8 under the said edge in the adjustments described, yet allows the crossbar to detach easily, without catching on the pin 5, while the pin also must not be too high, or the door will be too low when set under the pin instead of under the door edge.

What I claim as new and desire to secure by Letters Patent is:

1. A box trap for capturing animals alive, comprising a box open at the front, a gravity door mounted vertically to slidably close the same, and a single unitary operating mechanism formed of a wire frame pivoted near the front of the box in each of the side walls thereof, having a yoke-shaped portion extending upwardly from either side of the box, and open centrally to permit the animal to pass through said yoke-shaped portion, and a rear portion composed of side bars integral with the yoke-shaped portion and with each other, and each projecting rearwardly at opposite sides of the box toward the rear wall of the trap, being spaced apart to leave the floor of the box empty and uncovered between said side bars for the passage of the animal upon the floor, and meeting at the rear ends, and a platform fixed upon and between the side bars, the said yoke portion of the frame having side members extending upwardly and forwardly from the side bars and formed with a crossbar between the side members integral therewith, the said frame being pivoted at each side in axially aligned pivots behind the door and near the floor of the trap, whereby animal pressure on the said platform will depress the same and pull back the crossbar of the yoke, the said crossbar being adapted to be brought under the lower edge of the door to be held thereby, to be released by either a light or a heavy touch upon the platform according to the setting of said crossbar under said door.

2. A box trap for capturing animals alive, comprising a box open at the front, a door slidably mounted to close said front against egress of the captive, and an interior operating mechanism for setting said door open and for releasing it by animal pressure, consisting of a wire frame pivotally mounted in the box behind the door, which frame extends laterally across the trap whereby it may be set under said door or part thereof, to let said door rest thereon and depress the forward part of the frame, the said frame having integral substantially horizontal portions at each side, projecting rearwardly to a point short of the rear wall of the trap, a platform fixed upon both of said side portions, and extending laterally across the central part of the trap at the rear whereby as the frame at front is depressed by the weight of the door thereupon, the platform is raised at the rear, the said wire frame being formed and adapted to be bent by the trapper to accommodate the various sizes of animals.

3. A box trap for capturing animals alive, comprising a box having its opening or entrance at one end, a gravity door slidably mounted thereat, a single unitary operating mechanism consisting of a wire frame comprising an upwardly rising yoke having a crossbar across the same adapted to be placed beneath the door, and embodying side members each pivoted to opposite walls of the box, and rearwardly projecting sidebars integrally formed with said yoke and commencing at the pivotal point of the side members, a platform fixed to the sidebars, the rear ends of said sidebars and the platform being located at a considerably greater distance from the pivots than the front cross-bar, and the rear portion of the wire frame being formed and adapted to be bent and reshaped by the trapper to adjust the height of the platform above the floor of the trap whereby to permit smaller unwanted animals to run in and out of the trap under said platform without releasing and closing the door.

4. A box trap for capturing animals alive, comprising a box open at the front, a gravity operated vertically slidable door mounted to close egress from the box and provided with a pin projecting inside the trap, said pin being positioned above the lower edge of said door, and a single unitary operating mechanism comprising a wire yoke-shaped frame having two vertical side members and an integral crossbar between the same which extends forwardly at the top to permit setting the trap by placing said crossbar either under said door in contact with the forward portion or the rear portion of the lower edge thereof, or under said pin, said pin being located relative to the roof of the trap to contact said roof when the door is raised to prevent removal of said door, the wire frame being pivotally mounted just behind said door and formed rearwardly with two side bars extending a considerably greater distance rearward from the pivot than the distance represented by the height of the yoke portion crossbar, the rear portion of said frame being provided with a fixed platform.

5. A box trap for capturing animals alive, comprising a box having an entrance, a slidably mounted door therefor, and a single unitary operating mechanism comprising an integral wire frame, yoke-shaped at the front thereof, with two substantially parallel side members extending upwardly from their lower ends to their upper ends, a laterally extending crossbar joining their upper ends and adapted to fit under the door, the said side members being curved segmentally to carry the crossbar under said door when the trap is to be set, the lower ends of the side members having loops which are pivoted each to opposite sidewalls of the trap, the said wire frame back of these loops being projected rearwardly and substantially horizontally therefrom, forming two side members extending on each side of the trap out of contact with the side walls thereof and meeting at their rear ends, a platform fixed thereon between the said last named members at a substantial distance from the pivot points and at a distance substantially greater than the said pivot points are from the door opening or the front crossbar of the yoke is from said pivots, whereby a substantial leverage is obtained from slight pressure upon the platform, the segmentally curved side members being adapted to be bent by the trapper to hold the crossbar thereof in selective engagement with said door.

GILBERT S. WARNER.

REFERENCES CITED

The following references are of record in the file of this patent:

FOREIGN PATENTS

| Number | Country | Date |
|--------|---------|------|
| 65,474 | Switzerland | May 5, 1913 |